Figure 2:
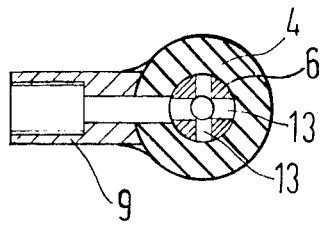

Oct. 19, 1965 W. G. NEWELL 3,212,682
TALC APPLYING DEVICE
Filed Nov. 30, 1964 2 Sheets-Sheet 1

INVENTOR:
WILLIAM G. NEWELL
BY
Browne, Schuyler + Beveridge
ATTORNEYS

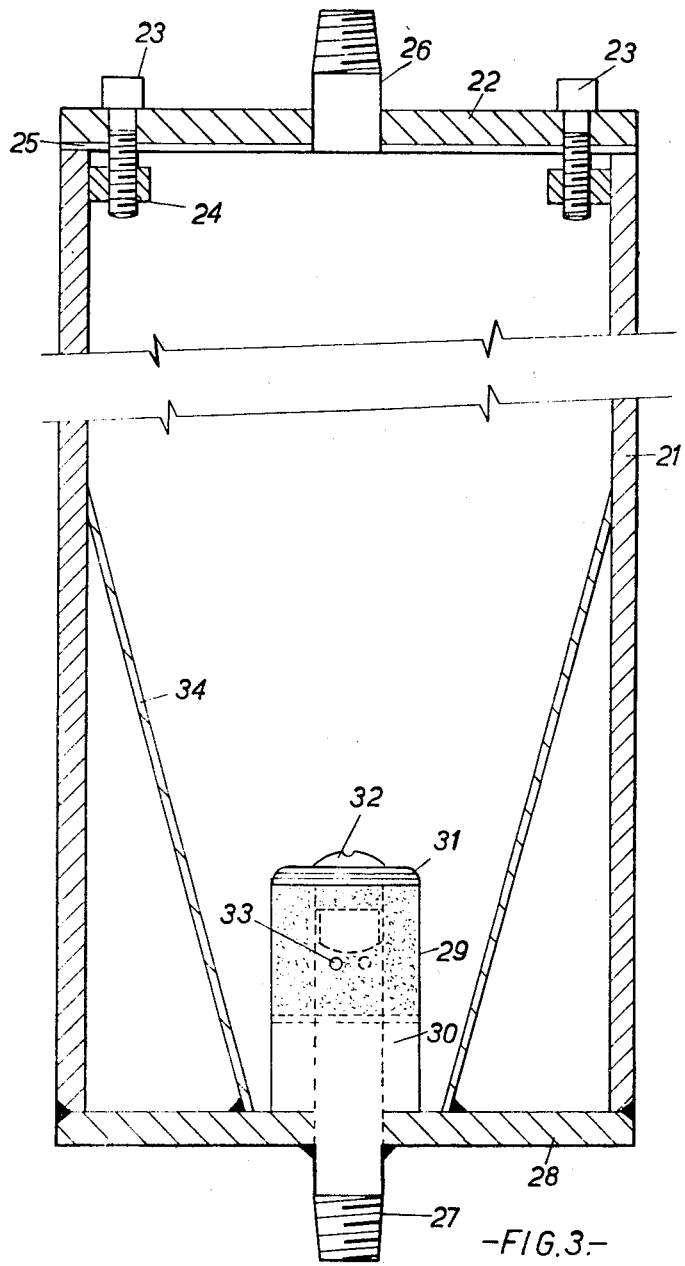

United States Patent Office 3,212,682
Patented Oct. 19, 1965

3,212,682
TALC APPLYING DEVICE
William George Newell, Stirchley, near Wellington, England, assignor to Rubber and Plastics Research Association of Great Britain, Shawbury, Shrewsbury, Shropshire, England
Filed Nov. 30, 1964, Ser. No. 414,565
Claims priority, application Great Britain, Nov. 30, 1963, 47,367/63; Oct. 9, 1964, 41,198/64
4 Claims. (Cl. 222—189)

The present invention relates to a device for controlling the amount of dusting powder applied to articles. The device is particularly suited for use in the rubber industry where talc is frequently employed as a dusting powder.

During manufacture, rubber articles on emerging from, for example, an extruder or a calender, are tacky and it is therefore necessary to apply talc to the articles before they are cured, in order to prevent them sticking and bonding together in handling and during the curing process. The talc can be applied in a number of ways. For example, the article can be passed through a trough of talc so that they become coated, or the articles can be simply sprinkled with the talc as they emerge from the extruder. Such methods are inefficient, lead to the atmosphere becoming heavily laden with the talc to the detriment of the operatives' health and cannot control the amount of talc applied to the articles.

The present invention seeks to provide a device which overcomes these disadvantages, is suitable for use on an industrial scale and which can apply a controlled amount of dusting powder to the articles.

According to one aspect of the present invention, a device for controlling the amount of dusting powder applied to articles comprises a closed powder container having an inlet for compressed gas and an outlet for conveying a gas/powder mixture to articles to be treated, a permeable member being located in the path of compressed gas entering the container to serve as a barrier preventing dusting powder from entering and blocking the gas inlet.

Preferably the compressed gas inlet comprises a rotatable hollow shaft or spindle communicating within the container with transversely extending hollow arms having spaced apertures therein for directing the gas through a large area of dusting powder within the container. In this way, the possibility of the gas channelling through the dusting powder in the container is minimized. Preferably the gas is delivered to the talc in a series of discrete puffs or bursts.

According to another aspect of the present invention, a device for controlling the amount of dusting powder applied to articles comprises a closed powder container having at least one compressed gas inlet terminating in a permeable member located at one end of the container, and at least one gas/powder outlet situated at the opposite end of the container, the permeable member serving as a barrier to prevent ingress of dusting powder into the gas inlet.

The permeable member may be in the form of a hollow cylindrical porous tile mounted over the end of the compressed gas inlet. The interior of the container may be tapered towards the permeable member so as to direct the talc in the container into the vicinity of the permeable member.

By virtue of the present invention the amount of talc blown out of the container can be controlled simply by adjustment of the compressed gas input. The gas is generally compressed air.

Figure 1:
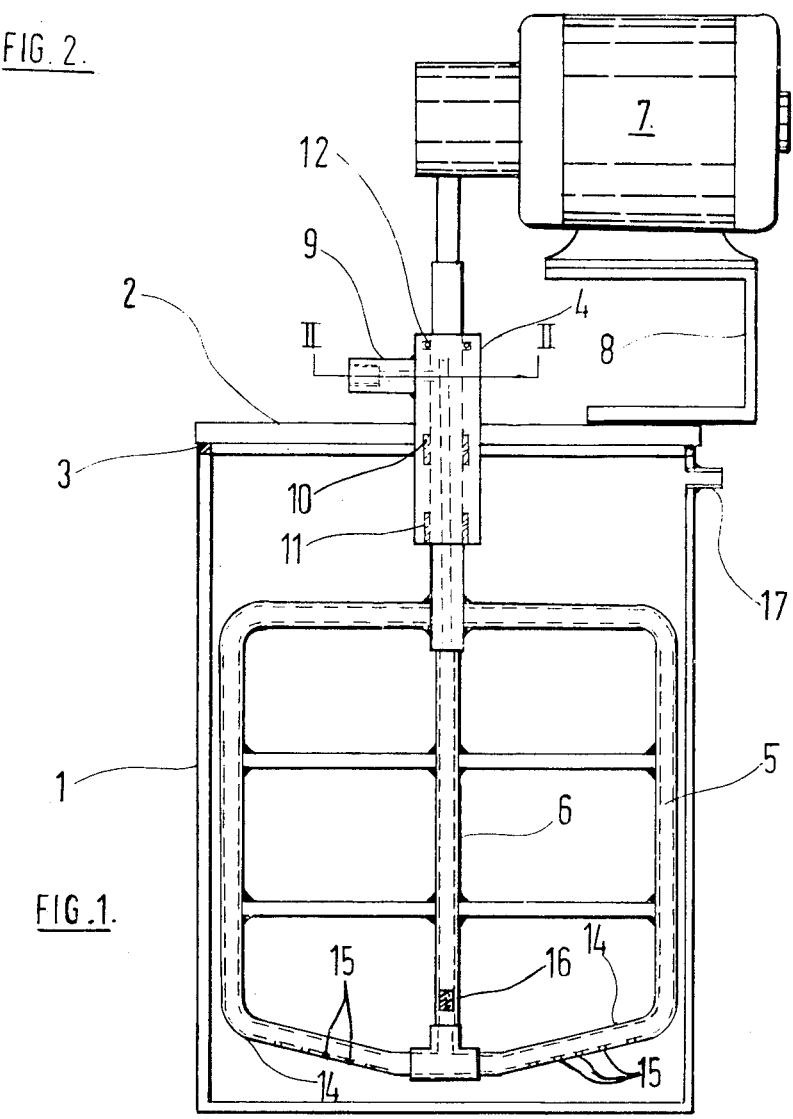

The invention will be further described, by way of example, with reference to the accompanying drawings, in which:

FIG. 1 is an elevation, partly in section, of a device for applying dusting powder;
FIG. 2 is a section along the line II—II in FIG. 1; and
FIG. 3 is a section through a second embodiment of the device.

With reference first to FIGS. 1 and 2, a talc or dusting powder container 1 has a detachable head 2 which can be held in position by means of, for example, clamps (not shown). A sealing gasket 3 is situated between the top of the container and the lid.

A hollow cylindrical housing 4 is secured to the centre of the lid 2 to serve as a bearing for a paddle 5 within the container 1 and the central spindle 6 of which passes through the lid 2 and the housing 4. The end of the spindle 6 projecting out of the housing 4 is coupled to an electric motor 7 which is carried on a bracket 8 secured to the lid 2. The motor 7 provides a drive for rotating the spindle and hence the paddle 5.

The housing 4 is formed with a projecting pipe 9, the interior of which communicates with the hollow interior of the housing. The pipe 9 serves as an inlet for a supply of compressed air into the container. The housing 4 carries two P.T.F.E. lined bearings 10 and 11 for the spindle 6. The spindle has a running fit with the bearings. An O ring 12 is set within the upper end of the housing 4 to encircle the spindle 6 and serve as a seal against leakage of compressed air. The spindle 6 does not make a tight fit with the interior of the housing 4 so as to prevent the spindle seizing up in the housing and also so as to allow a small quantity of compressed air to escape down past the bearings 10 and 11 into the container, thus ensuring that the bearing surfaces are kept free from talc.

The spindle is a hollow tube closed at its upper end above the level of the air inlet pipe 9. A number of radial apertures 13 are bored through the wall of the spindle opposite the inlet pipe 9 and as shown in FIG. 2. The lower end of the spindle carries a T-junction for connecting the spindle to the hollow interior of paddle arms 14. The lower surfaces of the arms 14 are provided with a series of apertures 15 enabling compressed air to enter the talc container. The apertures 15 are bored at an angle away from the direction of rotation of the paddle. A porous or permeable tile 16 is fittted into the lower end of the hollow spindle 6 and serves as a barrier to prevent talc from reaching the bearings. An outlet 17 for the talc/gas mixture is located near the top of the container.

In use, the paddle is rotated by the motor 7 and compressed air enters the container through the inlet pipe 9, radial bores 13, the interior of the spindle 6 and arms 14 and the bores 15 in the arms 14. The paddle is rotated at a low speed and due to the radial bores 13 air enters the container in a series of discrete puffs. This action, in addition to the emergence of the compressed air into the container from a number of spaced apart apertures 15, reduces the possibility of air channeling through the talc. The talc/air mixture leaves the container through the outlet 17 to be piped to a suitable jet distributor.

Referring now to FIG. 3, a container 21 which is, for example, of circular or rectangular transverse cross section, is closed at its upper end by a lid 22 secured by bolts 23 to a flange 24, running around the inner periphery of the container. A sealing gasket 25 is provided between the lid and the top of the container and the lid is apertured to carry an outlet nozzle 26. An inlet nozzle 27 passes through the base 28 of the container and carries a permeable head in the form of a hollow cylindrical porous tile or pot 29. When the container is filled with dusting powder the pot 29 serves as a barrier to prevent the powder from entering and blocking the inlet nozzle. The pot 29 is located upon a cylindrical base 30 and is closed at its upper end by a cover plate 31. The pot is fitted over the inlet nozzle 27 and is secured thereto by a bolt 32 passing through the cover plate and threaded into the end of the inlet nozzle. On tightening of the bolt 32, the pot is secured in position at the bottom of the container 21. The inlet nozzle is bored radially, as at 33, below its threaded end to permit compressed air to enter the interior of the pot. Due to the fact that the pot is bolted to the nozzle, it cannot be lifted off the bottom of the container by the gas pressure and the gas is thus forced to pass through the porous pot into the interior of the container. An inverted sheet metal cone 34 is inserted into the container with the neck of the cone encircling the porous pot.

In use, the container is filled with dry talc, for example French chalk, the inlet nozzle is connected to a compressor and the outlet nozzle is connected to an air/powder jet distributor. Preferably a drying chamber is inserted in the pipe line between the compressor and the inlet nozzle so as to dry the compressed air before it enters the container and comes into contact with the talc. This is a necessary precaution as if the talc in the container gets damp it tends to coalesce and extraction becomes increasingly difficult. The jet distributor serves to direct fine sprays of talc on to the articles being treated and its form will depend upon the particular article. For example, in the case of a rod-shaped article, the distributor could comprise a ring having an annular passage, into which the air/talc mixture from the container is piped through two diametrically opposite inlets. A number of inwardly directed radial jets lead from this passage and open on the internal periphery of the ring. The rods to be dusted pass through the ring and the talc is blown on to their surfaces through the jets. By suitable choice of jet distributor any shape and size of article can be dusted and the amount of talc delivered to the article through the jets can be controlled by adjustment of compressed gas to the inlet of the container. An electrostatic field may be used in conjunction with the jet unit to ensure even distribution of talc over the article to be dusted, where very even distribution is desired.

It will be seen that the container itself is not formed with a jet outlet and thus the possibility of blockages occurring at the outlet is greatly diminished. In addition, the container can be of any desired size and so can contain sufficient talc for dusting a large number of articles, a necessary attribute for industrial use.

I claim:
1. A device for controlling the amount of dusting powder applied to articles comprising a closed container for the dusting powder, a rotatable hollow shaft serving as an inlet for compressed gas extending into the interior of the container, a conduit for conveying a gas/dusting powder mixture from the container to articles to be treated, hollow arms within said container radiating from said hollow shaft and having spaced apertures therein for directing compressed gas through a large area of powder within the container and a gas-permeable member located within the shaft adjacent the hollow arms, the gas-permeable member acting as a barrier to prevent ingress of dusting powder into the gas inlet.

2. A device according to claim 1 including means for admitting the compressed gas into the container in a series of discrete puffs.

3. A device for controlling the amount of dusting powder applied to articles comprising a closed container for the dusting powder, a rotatable hollow shaft serving as an inlet for compressed gas extending into the container, bearing means for rotatably supporting the shaft in sealed relationship with the container, hollow arms radiating from the end of the shaft within the container and in communication with the interior of the shaft, said arms having apertures therein for admitting compressed gas into the interior of the container, drive means for rotating the shaft and hollow arms, means for admitting the compressed gas into the container in a series of discrete bursts, means for conveying a gas/powder mixture from the container to articles to be treated and a porous tile located within the shaft serving as a barrier to prevent ingress of dusting powder into the gas inlet and the bearing means.

4. A device according to claim 3 in which said apertures are directed away from the direction of rotation of the shaft.

References Cited by the Examiner

UNITED STATES PATENTS

| | | | |
|---|---|---|---|
| 2,167,416 | 7/39 | Carlson | 222—195 |
| 2,587,714 | 3/52 | Embree et al. | 222—193 |
| 2,975,586 | 3/61 | Bray | 222—193 X |
| 3,155,287 | 11/64 | Gist | 222—193 X |
| 3,166,222 | 1/65 | Schrader | 222—195 |

LOUIS J. DEMBO, *Primary Examiner.*